US009653074B2

(12) United States Patent
Weng

(10) Patent No.: US 9,653,074 B2
(45) Date of Patent: May 16, 2017

(54) WIRELESS PHOTOGRAPHIC DEVICE AND VOICE SETUP METHOD THEREFOR

(71) Applicant: VIVOTEK INC., New Taipei (TW)

(72) Inventor: Shu-Che Weng, New Taipei (TW)

(73) Assignee: VIVOTEK INC., New Taipei (TW)

( * ) Notice: Subject to any disclaimer, the term of this patent is extended or adjusted under 35 U.S.C. 154(b) by 165 days.

(21) Appl. No.: 14/462,235

(22) Filed: Aug. 18, 2014

(65) Prior Publication Data

US 2015/0097979 A1    Apr. 9, 2015

(30) Foreign Application Priority Data

Oct. 9, 2013 (TW) .............................. 102136506 A

(51) Int. Cl.
| | |
|---|---|
| *G10L 15/22* | (2006.01) |
| *H04W 12/04* | (2009.01) |
| *G10L 13/04* | (2013.01) |
| *H04W 84/12* | (2009.01) |

(52) U.S. Cl.
CPC .............. *G10L 15/22* (2013.01); *G10L 13/04* (2013.01); *H04W 12/04* (2013.01); *G10L 2015/223* (2013.01); *H04W 84/12* (2013.01)

(58) Field of Classification Search
USPC ........................................................ 704/275
See application file for complete search history.

(56) References Cited

U.S. PATENT DOCUMENTS

| | | | | |
|---|---|---|---|---|
| 6,243,682 | B1 * | 6/2001 | Eghtesadi | G03G 15/5016 704/270 |
| 6,892,083 | B2 * | 5/2005 | Shostak | H04L 67/12 455/41.2 |
| 8,694,322 | B2 * | 4/2014 | Snitkovskiy | G06F 3/167 704/251 |
| 8,898,064 | B1 * | 11/2014 | Thomas | G06F 21/32 704/270 |
| 2002/0065661 | A1 * | 5/2002 | Everhart | H04M 1/271 704/275 |
| 2005/0136834 | A1 * | 6/2005 | Bonta | H04L 29/12254 455/11.1 |
| 2008/0004009 | A1 * | 1/2008 | Caldwell | H04L 29/12188 455/434 |
| 2008/0091432 | A1 * | 4/2008 | Dalton | G10L 15/26 704/275 |
| 2010/0169098 | A1 * | 7/2010 | Patch | G10L 15/00 704/275 |

(Continued)

*Primary Examiner* — Douglas Godbold
(74) *Attorney, Agent, or Firm* — Maschoff Brennan

(57) ABSTRACT

A wireless photographic device is provided along with a voice setup method therefor: Obtain at least one wireless network identifier according to a first voice command; synthesize and play a first machine voice according to the obtained wireless network identifier; determine, according to a second voice command, whether to utilize the obtained wireless network identifier on the wireless photographic device. The present invention discloses a simplified wireless LAN setup procedure, using only a wireless interface and a voice man-machine interface and unassisted by any auxiliary equipment. The synthesized voice feedback ensures validity of the setup data. If the man-machine interface processes only digits, alphabetic letters, and set commands, the cost for manufacturing the wireless photographic device is further reduced.

10 Claims, 3 Drawing Sheets

(56) References Cited

U.S. PATENT DOCUMENTS

| | | | |
|---|---|---|---|
| 2011/0178804 A1* | 7/2011 | Inoue | G01C 21/3608 704/275 |
| 2012/0089392 A1* | 4/2012 | Larco | G10L 15/063 704/231 |
| 2012/0102552 A1* | 4/2012 | Sammon | G06F 21/31 726/5 |
| 2013/0185078 A1* | 7/2013 | Tzirkel-Hancock | G10L 15/22 704/275 |
| 2014/0064511 A1* | 3/2014 | Desai | H04R 1/1041 381/74 |

* cited by examiner

WIRELESS PHOTOGRAPHIC DEVICE AND VOICE SETUP METHOD THEREFOR

CROSS-REFERENCE TO RELATED APPLICATIONS

This non-provisional application claims priority under 35 U.S.C. §119(a) on Patent Application No. 102136506 filed in Taiwan, R.O.C. on the ninth of Oct. 9, 2013, the entire contents of which are hereby incorporated by reference.

BACKGROUND OF THE INVENTION

Technical Field of the Invention

The present invention relates to wireless LAN (local area network) setup, particularly to a wireless photographic device and a voice setup method therefor.

Description of the Related Art

Wireless LAN has become a feature of the twenty-first century. If optical fiber completes the last mile of Internet access, then the last ten yards of that mile, for many households, cafés, libraries, and even transport stations, is wireless LAN. Because several wireless LANs may exist in one space, configuring a device to connect to one of the many existing access points typically requires knowledge of the name (service set identifier) and the security key (e.g. a pre-shared key) of that particular access point: a seemingly simple setting, yet rather inconvenient in practice. Consider an IP (Internet Protocol) camera having a wireless interface for example. The biggest difference between the IP camera and a webcam is that the IP camera can operate independently and obtain network access without having to be connected through, say, USB with a computer first. In general, the IP camera may also have a wired interface such as Ethernet, so that a user can connect the camera to a wired network, discover it on that network from other networking equipment (e.g. a laptop or a tablet), and perform wireless LAN setup over the wired network through a webpage interface provided by the camera. The procedure is more complicated if the IP camera has only the wireless interface: The user needs to turn the camera into an access point, and then connect to and configure it using other wireless equipment. The user may otherwise employ extra equipment to generate a two-dimensional barcode (e.g. QR code). The camera scans the barcode held at short distance to be informed of which wireless LAN to connect to and what security key to use.

The disadvantage of the methods described above is that the lack of a man-machine interface necessitates auxiliary equipment, creates additional cost, and exposes more operation complexity and even hazard to the configuring user.

SUMMARY OF THE INVENTION

In light of this, the present invention provides a wireless photographic device and a voice setup method therefor, wherein wireless LAN setup, especially that during the installation of devices with no network interface other than a wireless one, is simplified and rendered more intuitive and convenient.

Reiterated, the present invention aims to provide a voice setup method for configuring a device having at least a wireless LAN interface and a voice man-machine interface. The device may be a wireless photographic device that the present invention also aims to provide. The wireless photographic device completes the setup procedure after a network detection command is issued or the setup data is uttered by a user and is fed back as voice synthesized by the device and confirmed by user. Neither intervention nor assistance of auxiliary equipment is required.

The voice setup method for a wireless photographic device, as provided, comprises obtaining at least one wireless network identifier according to a first voice command, synthesizing and playing a first machine voice according to the obtained wireless network identifier, and determining, according to a second voice command, whether to utilize the obtained wireless network identifier. When the second voice command indicates that the obtained wireless network identifier be utilized, the wireless network identifier is set into the wireless photographic device.

The wireless photographic device, as provided, comprises a wireless communication module, a voice receiving module, a voice playing module, and a processing module. The wireless communication module is adapted for communicating with wireless networks. The voice receiving module is adapted for receiving first and second voice commands. The voice playing module is adapted for playing a first machine voice. The processing module, coupled with the other modules, is adapted for obtaining at least one wireless network identifier according to the first voice command, for synthesizing the first machine voice according to the obtained wireless network identifier, and for determining, according to the second voice command, whether to utilize the obtained wireless network identifier. When the second voice command indicates that the obtained wireless network identifier be utilized, the processing module sets the wireless network identifier into the wireless communication module.

In short, the present invention provides a wireless photographic device and a voice setup method therefor, wherein simplified wireless LAN setup can be completed using only a wireless interface and a voice man-machine interface and unassisted by any auxiliary equipment. Manners in which a user may communicate with the device include issuing a network detection command, uttering the setup data, and expressing approval or disapproval toward the synthesized voice feedback of the device. The setup data includes wireless network identifier and/or security key.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
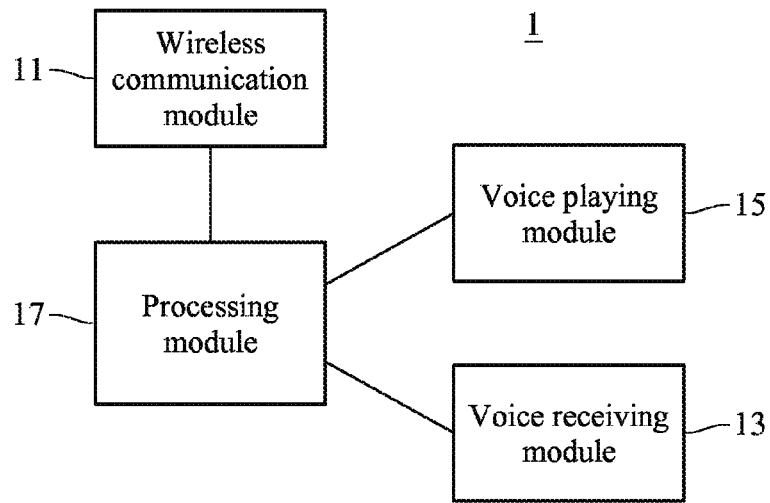
FIG. 1 is a high-level block diagram of a wireless photographic device according to an embodiment of the present invention.

Please refer to FIG. 1. FIG. 1 is a high-level block diagram of a wireless photographic device 1 according to an embodiment of the present invention. As shown in FIG. 1, the wireless photographic device 1 comprises a wireless communication module 11, a voice receiving module 13, a voice playing module 15, and a processing module 17. The processing module 17 is respectively coupled with the wireless communication module 11, the voice receiving module 13, and the voice playing module 15. The wireless communication module 11 is a wireless LAN (local area network) interface of the wireless photographic device 1 and conforms to the IEEE 802.11 standards. The voice receiving module 13 and the voice playing module 15 are a man-machine interface of the wireless photographic device 1. The voice receiving module 13 may be a microphone adapted for converting received analog audio (e.g. human voice) into digital signals, which are then recognized by the processing module 17. The voice playing module 15 may be a speaker adapted for receiving digital signals from the processing module 17 and converting them into analog audio for playing. The digital signals received from the processing module 17 are machine voice synthesized by the processing module 17 using speech synthesis technology.

Figure 2:
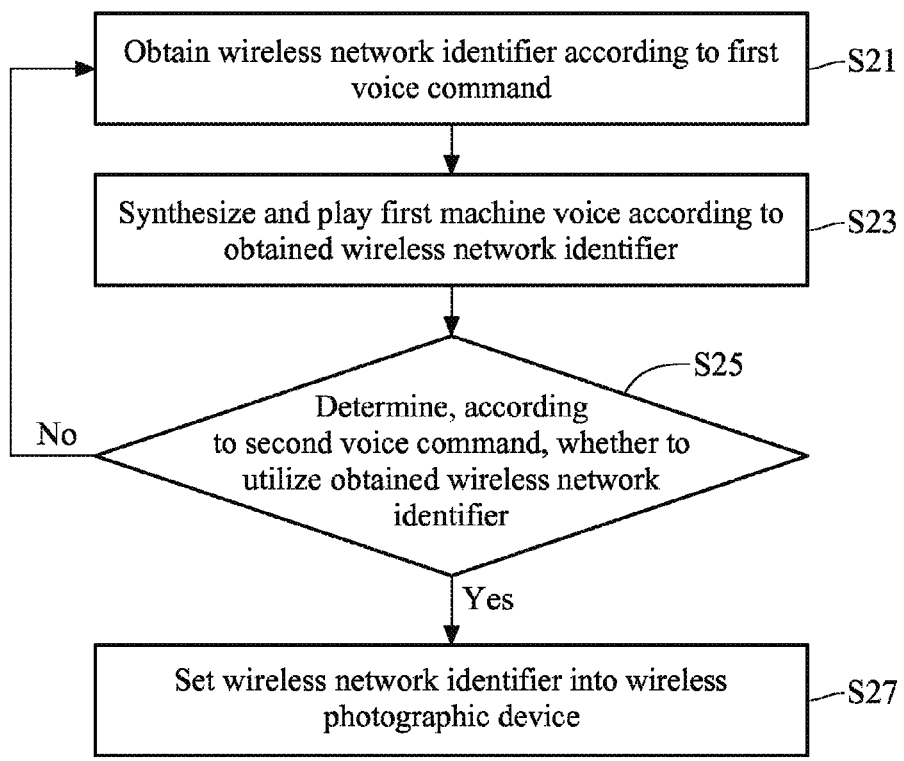
FIG. 2 through FIG. 4 are flowcharts of voice setup methods for a wireless photographic device, in accordance with various embodiments of the present invention.

Please refer to FIG. 2. FIG. 2 is a flowchart of a voice setup method for the wireless photographic device 1, in accordance with an embodiment of the present invention. In step S21, the voice receiving module 13 receives a first voice command, and the processing module 17 obtains a wireless network identifier according to the first voice command. The wireless network identifier may be a service set identifier (SSID)—that is, a name—of a certain wireless LAN. The first voice command is an utterance of the wireless network identifier. In one embodiment, the uttering may be normal, verbatim (word-by-word) pronunciation in a natural language. For example, suppose that the SSID is "Chicken House", then the first voice command is the words "chicken" and "house" spoken in that order, and the processing module 17 obtains the wireless network identifier by recognizing those two words. The computing capability of the processing module 17 is generally not as powerful as that of corresponding modules (including central processing units, memories, etc) in a desktop computer, and cloud-based speech recognition is out of the question before the wireless photographic device 1 gets onto the network. In another embodiment, therefore, the uttering may be symbol-by-symbol pronunciation so as to significantly increase the reliability or accuracy of the recognition and to decrease reliance on computing capability, wherein a symbol may be a digit, an alphabetic letter, or a special character. For example, suppose that the SSID is "RJ2280", then the first voice command is the letters or digits R, J, 2, 2, 8, and 0 read aloud in that order, the processing module 17 thereby spelling out the wireless network identifier. The pronunciation of letters, digits, or special characters may be agreed upon in advance. For example, the pronunciation of the letter "J" may be "jay" in English, "jota" in Spanish, or "Juliett" as defined in the International Radiotelephony Spelling Alphabet, while the pronunciation of "-" may be "hyphen" or "dash" in English. Moreover, cases of a letter may be expressed in terms of the length of the utterance. For example, holding a letter for at least a certain number of seconds may represent the uppercase, and the lowercase is represented otherwise. The end of an utterance of the whole SSID may be marked by a pause longer than a certain number of seconds.

In step S23, the processing module 17 synthesizes the wireless network identifier obtained from the first voice command as a first machine voice, which is then played by the voice playing module 15. The first machine voice may be verbatim and natural pronunciation, or may be a spelling of letters, digits, or special characters, or may be a combination of both. Because the result of the processing module 17 performing speech recognition on the first voice command may be inaccurate, synthesizing and playing back the first voice command allow the user inputting it to confirm the correctness of the wireless network identifier obtained by the processing module 17. The first machine voice may include a recitation of the first voice command and additional instruction from the wireless photographic device for the inputting user, such as "The network name you entered is: R, J, 2, 2, 8, 0. Please say 'Yes' if it is correct, and 'No' if not." The processing module 17 may synthesize and play the machine voice only after the user finishes uttering the whole SSID, or it may synthesize and play the machine voice word-by-word or symbol-by-symbol during the utterance.

"Yes" and "No" are examples of a second voice command in step S25. In step S25, the processing module 17 determines, according to the second voice command, whether the obtained wireless network identifier is correct. Potential second voice commands may be agreed upon in advance, wherein at least one expresses affirmation, such as "Yes" hereinbefore. When the second voice command is affirmative, the obtained wireless network identifier is to be utilized; that is, the processing module 17 sets the wireless network identifier into the wireless communication module 11 in step S27, so that connection with a certain wireless LAN can be carried out. The second voice command may as well express disapproval or uncertainty, such as "No" hereinbefore or silence. Such a situation suggests that the first voice command may be inaccurately recognized, and the flow of execution goes back to step S21, the processing module 17 attempting again to obtain the wireless network identifier according to another first voice command. Alternatively, affirmation may be represented by silence and any voice or a certain voice may represent disapproval.

Figure 3:
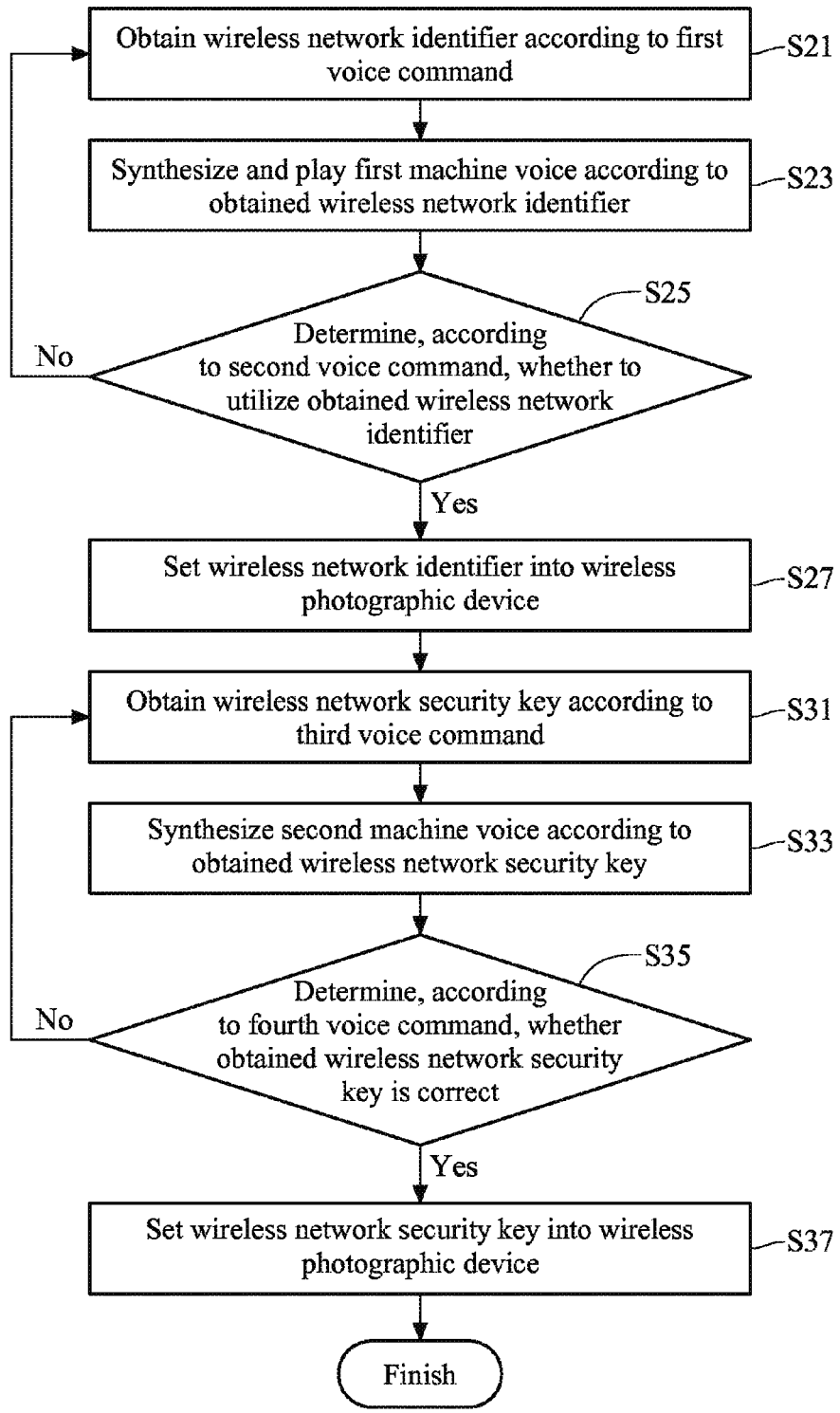

Please refer to FIG. 3. FIG. 3 is a flowchart of a voice setup method for the wireless photographic device 1, in accordance with another embodiment of the present invention. The embodiment in FIG. 2 applies to wireless LANs which can be accessed with just the names. That shown in FIG. 3, however, is for networks that further require as input security keys. The embodiment in FIG. 3 includes steps S21 to S27 of FIG. 2, along with a procedure for setting security key. In step S27, after the wireless communication module 11 obtains the wireless network identifier, the flow of execution may go straight to step S31, or the wireless communication 11 may attempt communication with the wireless LAN access point bearing the wireless network identifier, thereby informed of the LAN's requirement with regard to security keys. In step S31, the voice receiving module 13 receives a third voice command and the processing module 17 obtains the wireless network security key according to the third voice command. The third voice command may be input in a manner similar or identical to the aforesaid first voice command. A strong wireless network security key or password usually does not include words found in a dictionary, and thus needs to be uttered symbol-by-symbol. As described above, the pronunciation of letters, digits, or special characters may be defined in advance, and length of utterance may represent cases of a letter.

Similar to step S23, in step S33, the processing module 17 synthesizes the wireless network security key recognized from the third voice command as a second machine voice, which is then played by the voice playing module 15, allowing the user inputting the third voice command to confirm the correctness of the recognized wireless network security key. The second machine voice is similar to the first machine voice, is basically a recitation of the third voice command, and may also include additional instruction as described above. In step S35, the processing module 17 determines, according to a fourth voice command, whether the obtained wireless network security key is correct. The fourth voice command is similar to the second voice command. When the fourth voice command is affirmative, the processing module 17 sets the wireless network security key into the wireless communication module 11 in step S37, so that connection with a certain wireless LAN can be established. When the fourth voice command expresses disapproval or uncertainty, the flow of execution goes back to step S31, the processing module 17 attempting again to obtain the wireless network security key according to another third voice command.

Inevitably, during the setup procedure, any of the voice commands or the machine voices might be overheard or eavesdropped. If there is concern for system security, in practice the security key configured in the wireless LAN's access point may be suspended, cancelled, or made temporary in advance. Immediately after the wireless photographic device 1 succeeds in connecting to the wireless LAN, the security key used by the access point and the wireless communication module 11 can be corrected through the network (e.g. through the webpage interfaces of the wireless photographic device 1 and the access point), rendering the eavesdropping ineffectual.

In addition, the setup procedure of the wireless network security key in FIG. 3 (steps S31 to S37) may be executed before that of the wireless network identifier (steps S21 to S27). The two procedures may as well be initiated by a certain part of the first or third voice command. For example, the first voice command may be "Name (pause for more than a certain number of seconds) Chicken House", wherein the word "Name" indicates that the setup procedure of the wireless network identifier is to be initiated, and "Chicken House" is the wireless network identifier for the processing module 17 to recognize.

Figure 4:
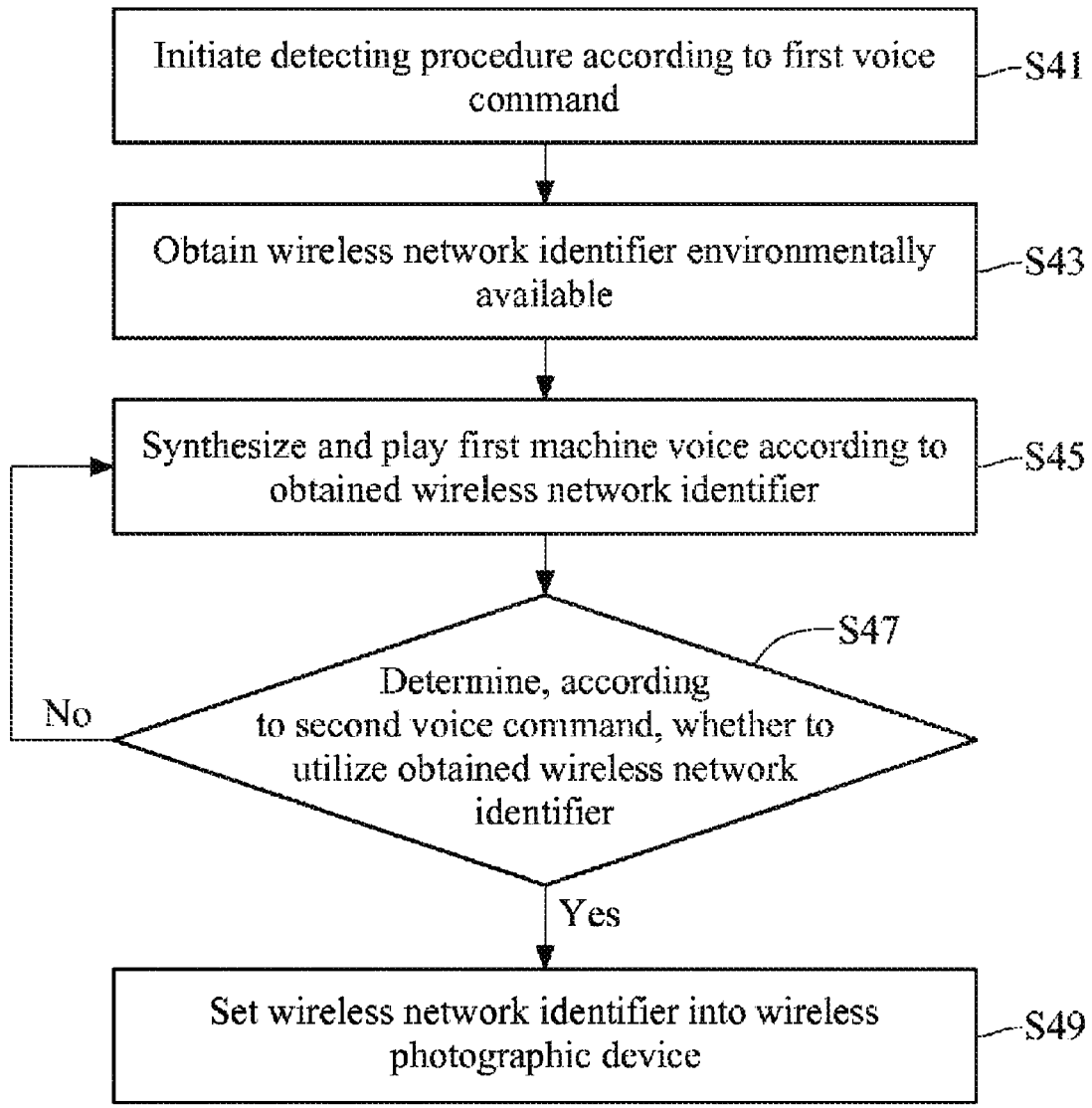

Please refer to FIG. 4. FIG. 4 is a flowchart of a voice setup method for the wireless photographic device 1, in accordance with yet another embodiment of the present invention. In step S41, the voice receiving module 13 receives the first voice command, with regard to which the processing module 17 makes a judgment. If it is judged that the first voice command is a detection command, a site survey is initiated on the wireless communication module 11 to collect all the beacons of the access points in the environment or to probe and collect all the probe responses, so that at least one wireless network identifier is obtained in step S43. The choice of word for the detection command and the pronunciation of that word as a voice input ("Survey", for example) may be agreed upon in advance as described above. The obtained at least one wireless network identifier forms a list representing the at least one wireless LAN environmentally available. In step S45, the processing module 17 synthesizes the first machine voice according to the list, wherein the first machine voice may be one or every wireless network identifier on the list concatenated to another and played by the voice playing module 15. While the voice playing module 15 sequentially plays every wireless network identifier on the list, the processing module 17 in step S47 determines, similar to in step S25 and according to the second voice command, whether to utilize the wireless network identifier currently played. The processing module 17 may insert an interval of a certain number of seconds between adjacent wireless network identifiers in the first machine voice so as to allow the user to utter the second voice command during the interval. When the second voice command is affirmative, step S45 terminates and the processing module 17 sets the wireless network identifier currently played into the wireless communication module 11 in step S49, so that connection can be carried out with the wireless LAN access point represented by the wireless network identifier. When the second voice command expresses disapproval or uncertainty, the voice playing module 15 continues to play in step S45 the next wireless network identifier on the list, while the processing module 17 waits for another second voice command in step S47.

Similar to FIG. 3, the setup procedure of the wireless network identifier in steps S41 to S49 may accompany that of the wireless network security key (steps S31 to S37), and there is by no means an order by which the two procedures must be executed. Moreover, the wireless photographic device 1 may possess both embodiments of the method in FIG. 2 and FIG. 4, wherein the processing module 17 determines which one to execute according to the nature of the first voice command. For example, if the first voice command is a sequence of letters and digits, the flow of execution enters the procedure beginning at step S21; if the first voice command is "Survey" as previously agreed, the flow of execution starts with step S41 for detecting wireless LANs available in the environment.

In order that the voice man-machine interface of the wireless photographic device 1 become more user-friendly, the voice setup method of the present invention may comprise more information and instruction in said or other voice commands or machine voices. For example, when a wireless photographic device 1 capable of both procedures in FIG. 2 and FIG. 4 is powered on, the processing module 17 may play "Please read the SSID letter-by-letter, or say 'Survey'" through the voice playing module 15 to inform the installing user of the kind of first voice commands it expects. In another embodiment, when both the second and fourth voice commands indicate that the data obtained by the processing module 17 is correct, the voice playing module 15 may play "Connecting; please wait", "Connection succeeded; you may now enjoy the wireless photographic device", etc, further smoothing the man-machine interaction, while the wireless communication module 11 is establishing the connection or when the connection is established. In yet another embodiment, the processing module 17 may record a Boolean variable A and set it "true" when the connection of the wireless photographic device 1 is valid and successful. Thereafter the wireless photographic device 1 will not enter the wireless network setup procedure during a power-on or a reboot. In this example, the first voice command may further include a command resetting the Boolean variable A, such as "Reset". When the first voice command as a whole is recognized as "Reset", the processing module 17 sets A to "false" and causes the execution of step S41, for detecting wireless LANs environmentally available, or step S21 or S31. In addition, the system may also record another Boolean variable B and provide a webpage interface for setting B. Voice setup is enabled if B is "true" and disabled if B is "false". B is "true" as factory default of the wireless photographic device 1, whereas the user, after completing wireless network setup, may connect to the webpage interface of the wireless photographic device 1 to disable voice setup.

In conclusion, the wireless photographic device and the voice setup method therefor of the present invention realize a simplified wireless LAN setup procedure which addresses security concerns, using only a wireless interface and a voice man-machine interface and unassisted by any auxiliary equipment. Furthermore, the synthesized voice feedback ensures validity of the setup data. If the processing module deals with only digits, alphabetic letters, and set commands during speech recognition and synthesis, the cost for manufacturing the whole device is further reduced and reliability increased.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A voice setup method for a wireless photographic device, the voice setup method comprising:
   obtaining at least one wireless network identifier according to a first voice command including the at least one wireless network identifier or a command of site survey;
   synthesizing and playing a first machine voice comprising the obtained wireless network identifier;
   determining, according to a second voice command, whether to utilize the obtained wireless network identifier; and
   establishing a list comprising the obtained wireless network identifier representing a wireless network environmentally available, the first machine voice being synthesized according to the list;
   wherein when the second voice command indicates that the obtained wireless network identifier be utilized, the wireless network identifier is set into the wireless photographic device.

2. The voice setup method of claim 1, wherein the first voice command is at least one element selected from a set consisting of digits, alphabetic letters, and special characters.

3. The voice setup method of claim 1, wherein obtaining the at least one wireless network identifier is initiating a detecting procedure according to the first voice command, in order to obtain the at least one wireless network identifier environmentally available.

4. The voice setup method of claim 1, further comprising:
   obtaining a wireless network security key according to a third voice command; and
   setting the wireless network security key into the wireless photographic device.

5. The voice setup method of claim 4, wherein setting the wireless network security key into the wireless photographic device comprises:
   synthesizing a second machine voice according to the obtained wireless network security key; and
   determining, according to a fourth voice command, whether the obtained wireless network security key is correct;
   wherein when the fourth voice command indicates that the obtained wireless network security key is correct, the wireless network security key is set into the wireless photographic device.

6. A wireless photographic device, comprising:
   a voice receiving module adapted for receiving a first voice command and a second voice command;
   a voice playing module adapted for playing a first machine voice; and
   a processing module coupled with the wireless communication module, the voice receiving module, and the voice playing module, adapted for obtaining at least one wireless network identifier according to the first voice command, for synthesizing the first machine voice, and for determining, according to the second voice command, whether to utilize the obtained wireless network identifier;
   wherein the first voice command and the first machine voice comprise the obtained wireless network identifier, and when the second voice command indicates that the obtained wireless network identifier be utilized, the processing module sets the wireless network identifier into the wireless communication module;
   wherein the processing module establishes a list comprising the obtained wireless network identifier representing a wireless network environmentally available, and synthesizes the first machine voice according to the list.

7. The wireless photographic device of claim 6, wherein the first voice command is at least one element selected from a set consisting of digits, alphabetic letters, and special characters.

8. The wireless photographic device of claim 6, wherein the processing module, adapted for obtaining the at least one wireless network identifier, initiates a detecting procedure on the wireless communication module according to the first voice command, in order to obtain the at least one wireless network identifier environmentally available.

9. The wireless photographic device of claim 6, wherein the voice receiving module is further adapted for receiving a third voice command, and the processing module is further adapted for obtaining a wireless network security key according to the third voice command and for setting the wireless network security key into the wireless communication module.

10. The wireless photographic device of claim 9, wherein the voice receiving module is further adapted for receiving a fourth voice command, the voice playing module is further adapted for playing a second machine voice, and the processing module is further adapted for synthesizing the second machine voice according to the obtained wireless network security key and for determining, according to the fourth voice command, whether the obtained wireless network security key is correct, wherein when the fourth voice command indicates that the obtained wireless network security key is correct, the processing module sets the wireless network security key into the wireless communication module.

* * * * *